US011062401B1

(12) United States Patent
Zhao et al.

(10) Patent No.: US 11,062,401 B1
(45) Date of Patent: Jul. 13, 2021

(54) OPTIMAL NOTIFICATION

(71) Applicant: Pinterest, Inc., San Francisco, CA (US)

(72) Inventors: Bo Zhao, Redwood City, CA (US);
Samuel Seth Weisfeld-Filson, Richmond, CA (US); John William Gupta Egan, Mountain View, CA (US); Burkay Birant Orten, Belmont, CA (US); Koichiro Narita, San Francisco, CA (US)

(73) Assignee: Pinterest, Inc., San Francisco, CA (US)

(*) Notice: Subject to any disclaimer, the term of this patent is extended or adjusted under 35 U.S.C. 154(b) by 239 days.

(21) Appl. No.: 15/805,763

(22) Filed: Nov. 7, 2017

(51) Int. Cl.
*G06Q 10/10* (2012.01)
*G06Q 10/06* (2012.01)
*G06Q 30/02* (2012.01)
*G06Q 40/02* (2012.01)
*G06Q 50/00* (2012.01)
*G06N 20/00* (2019.01)

(52) U.S. Cl.
CPC ............ *G06Q 50/01* (2013.01); *G06N 20/00* (2019.01)

(58) Field of Classification Search
CPC ............................... G06Q 50/01; G06N 20/00
USPC .................................................. 705/1.1–912
See application file for complete search history.

(56) References Cited

U.S. PATENT DOCUMENTS

| 8,560,678 | B2* | 10/2013 | Tseng ...................... H04L 65/40 709/224 |
| 8,751,636 | B2* | 6/2014 | Tseng ..................... G06Q 50/01 709/224 |
| 9,633,121 | B2* | 4/2017 | Boucher ............. G06F 16/9535 |
| 10,419,234 | B2* | 9/2019 | Ilic ......................... G06Q 30/02 |
| 10,469,354 | B2* | 11/2019 | Sun ....................... H04L 43/045 |
| 2013/0325550 | A1 | 12/2013 | Varghese et al. |
| 2014/0122622 | A1 | 5/2014 | Castera et al. |
| 2014/0156681 | A1 | 6/2014 | Lee et al. |
| 2014/0337436 | A1 | 11/2014 | Hoagland et al. |
| 2015/0310507 | A1 | 10/2015 | Woodward et al. |
| 2016/0134580 | A1 | 5/2016 | Castera et al. |
| 2016/0189198 | A1 | 6/2016 | McKenzie et al. |
| 2016/0314501 | A1 | 10/2016 | Bartholomew et al. |
| 2017/0124593 | A1 | 5/2017 | Nickerson et al. |
| 2017/0139921 | A1 | 5/2017 | Ball et al. |
| 2017/0140051 | A1 | 5/2017 | Ball et al. |
| 2017/0149721 | A1 | 5/2017 | Brunn et al. |
| 2017/0161281 | A1 | 6/2017 | Bhartia et al. |
| 2017/0220579 | A1 | 8/2017 | Kazi et al. |
| 2017/0220677 | A1 | 8/2017 | Kazi et al. |
| 2017/0255681 | A1 | 9/2017 | Giunio-Zorkin |
| 2017/0262451 | A1 | 9/2017 | Milner |
| 2017/0316599 | A1 | 11/2017 | Giunio-Zorkin et al. |

(Continued)

*Primary Examiner* — Jonathan P Ouellette
(74) *Attorney, Agent, or Firm* — Athorus, PLLC

(57) ABSTRACT

Systems and methods for generating user notifications to a set of users of a social networking service is presented. For each user of a set of users of the social networking service, one or more machine learning models selects an optimal notification channel, an optimal notification template, and optimal personalization content for configurable elements of a selected notification template. Each of these determinations/selections is made according to and based on a likelihood of increased user engagement with the social networking service. Upon determining the notification channel, notification template, and personalizations to the template, the notification is generated and sent to the corresponding user.

20 Claims, 8 Drawing Sheets

(56) References Cited

U.S. PATENT DOCUMENTS

| | | |
|---|---|---|
| 2017/0340963 A1* | 11/2017 | Bucher ................. A63F 13/533 |
| 2018/0013818 A1 | 1/2018 | Howard et al. |
| 2018/0013844 A1 | 1/2018 | Foged et al. |
| 2018/0150464 A1 | 5/2018 | Ma et al. |
| 2018/0174190 A1 | 6/2018 | Ferreira et al. |
| 2018/0189402 A1 | 7/2018 | Mullaney |
| 2018/0246899 A1 | 8/2018 | Natchu et al. |
| 2019/0034976 A1* | 1/2019 | Hamedi ............. G06Q 30/0271 |
| 2019/0068526 A1* | 2/2019 | Xie ......................... H04L 67/20 |
| 2019/0102463 A1* | 4/2019 | Ye .......................... G06Q 50/01 |

* cited by examiner

US 11,062,401 B1

OPTIMAL NOTIFICATION

BACKGROUND

Network-based services, such as social networking services, are often able to sign up a large subscriber base of users, but find that only a small percentage of those subscribers/users regularly participate and/or interact with the service or with others via the service.

Campaigns and promotions to increase user participation on these network-based services are largely "blanket efforts": campaigns to reach out to all subscribers/users irrespective of whether or not the efforts will be effective or ineffective for any given subscriber/user. Unfortunately, these blanket efforts result in substantial bandwidth consumption (e.g., electronically messaging or emailing millions of subscribers) with limited expectations of success while, at the same time, filling millions of inboxes (of those subscribers) with content that is often undesired and frequently viewed as nothing more than "spam."

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

Figure 1:
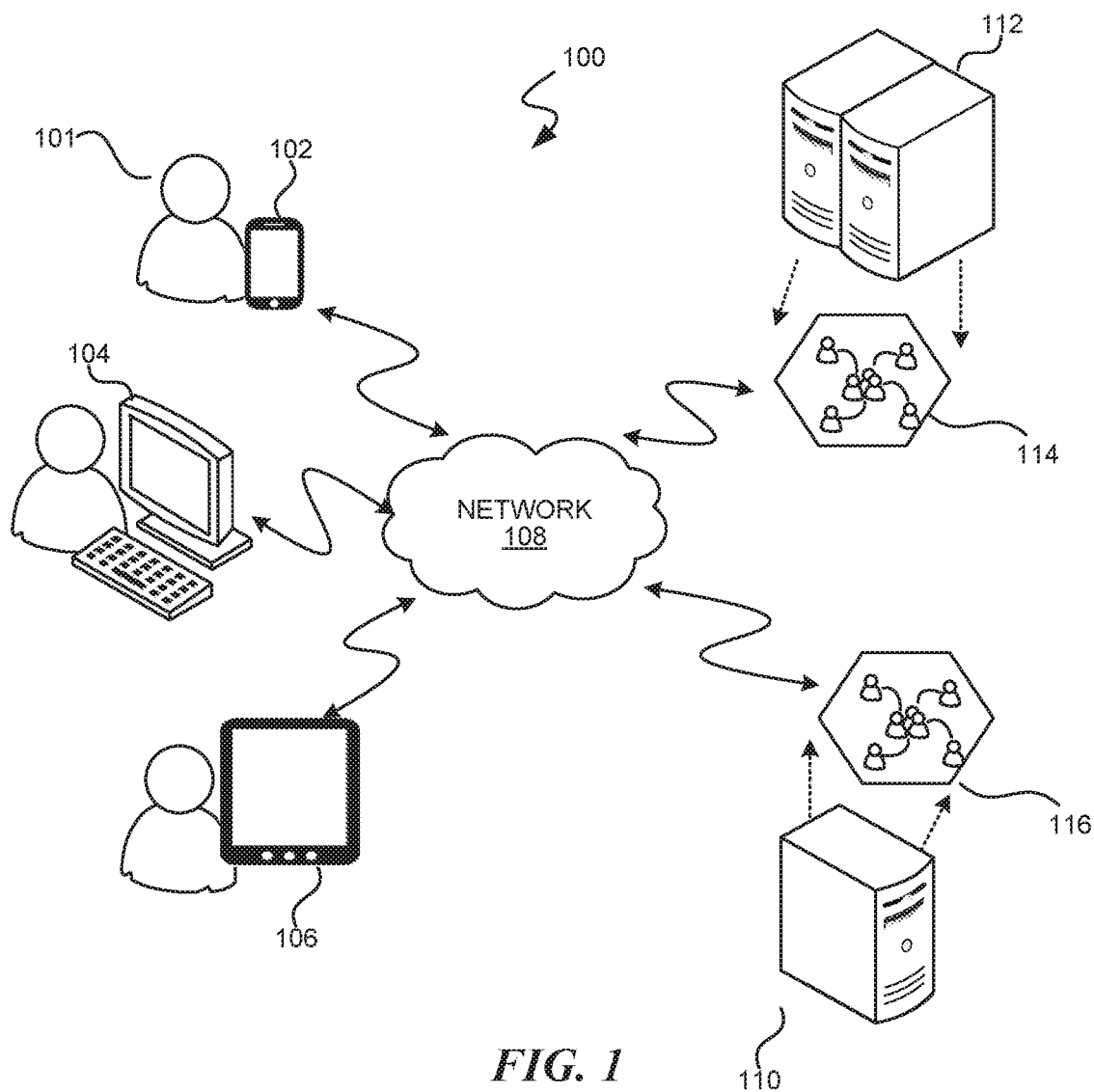
FIG. 1 is a pictorial diagram illustrating an exemplary network environment suitable for implementing aspects of the disclosed subject matter.

In view of the challenges with regard to generating heightened user interaction without resorting to blanket marketing, systems and methods for identifying a selected set of users of a social networking service for notification is presented. More particularly, upon receiving a notice of a re-post action by a first user, the social networking service identifies a first set of users of the service that have already posted that item of content. Scores are associated with the users of the first set of users, where the scores indicate a likelihood that, if notified of the re-post action of the first user, will result in heightened user interaction or engagement with the social networking service. From this first set of users, a subset of the users is identified according to their associated scores (those whose score indicates that sending a notification will most likely result in heightened user interaction with the social networking service) and a notice of the re-post action by the first user is sent to the users of this subset of users. Advantageously, this approach avoids simply blanketing all of the social networking service's users with a notice of the re-post, thereby reducing the costs associated with such a broad-spectrum distribution and reducing the resource bandwidth that would be required for such a broad-spectrum distribution. Further, this approach reduces the amount of unwanted and/or irrelevant messages that often clutter a user's inbox. Indeed, implementation of the disclosed subject matter selectively targets those users who are most likely to increase engagement with the social networking service.

For purposes of clarity and by way of definition, the term "exemplary," as used in this document, should be interpreted as serving as an illustration or example of something, and it should not be interpreted as an ideal or leading illustration of that thing. Stylistically, when a word or term is followed by "(s)", the meaning should be interpreted as indicating the singular or the plural form of the word or term, depending on whether there is one instance of the term/item or whether there is one or multiple instances of the term/item. For example, the term "user(s)" should be interpreted as one or more users. Moreover, the use of the combination "and/or" with regard to multiple items should be viewed as meaning either or both items.

By way of definition and description, a social networking service (also referred to as a social networking site) is an online platform (i.e., network accessible platform) to build or establish social networks or social relations among computer users. These social networks and/or relationships are often, though not exclusively, based on people/users who share similar interests, activities, backgrounds or real-life connections. A social network service typically creates an online representation for each user/subscriber, allows users to establish their social links and networks (relationships with others), and to post content to a virtual content space of the user or of other users. Typically, posted content in a user's virtual content space may be viewed by others, including those within the user's social network, though a posting user is often able to control who, if anyone, is able to view the posted content.

Regarding the notion of "posting content," as indicated above a user/subscriber of a social networking service is typically able to add content to the user's virtual content space or, alternatively, to another user's virtual content space (according to established permissions to do so). In addition to posting content, users are able to comment on and/or interact with other users in regard to posted content. Often, though not exclusively, users are able to provide an indication as to the user's like or dislike of posted content, as well as the user's like or dislike of comments regarding posted content. As used throughout this document, the term "post," should be interpreted as a posting action of an item of content to a social networking service, and is a generic term that includes both original posting actions and re-posting actions. Where it is important to differentiate between an original posting and a re-posting, the terms "original post" and "re-post" are used.

In addition to posting content, users are often able to re-post content. "Re-posting" content corresponds to posting content to a user's virtual content space (or to the virtual space of another user) using, as the content source for the re-posting, a previous post (or re-post) of an item of content on the social networking service by another user. By way of illustration, assume that User A posts an item of content, such as an image, on his/her virtual content space. Subsequently, User B (who can view and access the posted content of User A) sees the item of content posted by User A and, through a re-post action, re-posts the item of content on User B's virtual content space. This is an example of "re-posting."

As those skilled in the art will appreciate, re-posting content creates a so-called re-posting chain: a chain of posts beginning with an original post of the content and including all re-posts of the content by others. Of course, other users may post (as an original post) the identical item of content to the social networking service. These original postings are not part of a re-post chain as they do not include a re-post from posted content. Hence, a social networking service may have multiple original posts of the same content item, and each original post may have its own re-post chain. By way of definition, an original poster of a re-post chain is the user that posted the original post. Similarly, a re-poster is a user that re-posts previously posted content, as described above.

By way of definition, an item of content that may be posted may include any number of types and/or collections of content including, by way of definition and not limitation, an image, text, a video file, an audio file, a link to content, an executable file or app or application, and the like.

According to aspects of the disclosed subject matter, in response to receiving notice of a re-post action of an item of content by a first user of a social networking service, a set of users/recipients of the social networking service are identified and sent the notice of the re-post action. This set of users is optimally identified to include those users who, if notified of the re-post action, are most likely to respond with heightened user activity on the social networking service. More particularly, a first set of users of the social networking site are identified as users/subscribers that have posted (either as an original post or a re-post) the content that is newly re-posted by the first user. This first set of users includes one or more original posters of the content, as well as re-posters of the content. The users of the first set of users are scored according to various criteria to create an engagement score for each of the users. A selected, subset of users of the first set of users is identified according to those users whose score indicates that they are most likely to provide heightened engagement for the social networking site should this subset of users be notified of the re-posted content.

Regarding the scoring of each of the users of the first set of users, i.e., the engagement score, these scores may be determined, at least in part, as a function of the user's activity level on the social networking service. In this regard, users/subscribers of the social networking service that are already active (and those that are highly active) may be viewed as being less likely to respond with heightened engagement with the social networking service should they receive notification of a re-post action of an item of content that, at some previous point, they too have posted. On the other hand, those users/subscribers that have a very low activity level may no longer be interested in engaging with the social networking service. As such, users with a very low activity level may be scored lower, at least in regard to receiving notice of a re-post action.

In addition to the activity level of the users, the engagement score may be further determined according to the likelihood that the user will engage with the social networking service with knowledge of the re-post action of content that a user has previously posted. According to aspects of the disclosed subject matter, a machine learning process generates this particular determination (a likelihood determination) for each of the users according to, by way of illustration and not limitation, past behaviors of the user, past behaviors of similar users, past behaviors of the user's friends on the social networking site, a user's personal preferences, the user's indication of liking and/or disliking the same or similar content, and the like.

An additional criterion used to determine an engagement score is the likelihood that the user would view and/or interact with a notice regarding the re-post action of the first user. In other words, irrespective of whether or not the user would increase engagement with the social network service upon knowing of the re-post action of the first user, this determination is made as to whether the user would read or otherwise engage with the notification (such as an email) that will provide notice of the re-post action.

Based on some combination of any of these various criteria, an engagement score is determined for each of the first set of users. According to aspects of the disclosed subject matter, a higher engagement score signifies a higher overall likelihood that issuing a notice to the corresponding user will generate heightened user engagement with the social networking service, in contrast to a user with a lower engagement score. While the engagement score may be generated as a numeric value, in some embodiments a lower numeric value may indicate a "higher engagement score", where in other embodiments a higher numeric value may indicate a "higher engagement score."

Turning now to the figures, FIG. 1 is a pictorial diagram illustrating an exemplary network environment 100 suitable for implementing aspects of the disclosed subject matter. Indeed, the exemplary network environment 100 includes one or more social networking services, such as social networking services 114 and 116. As indicated, above, social networking services are online platforms for building social networks or social relations among computer users, and include the ability to post (and re-post) content to one or more virtual content spaces. Social networking services typically operate as "online services," meaning that the services operate as remote, network-accessible services with which one or more users (or subscribers) interact by way of a computing device, such as user 101 interacting with social networking service 114 over a network 108, in this case using a mobile smart phone 102.

According to aspects of the disclosed subject matter, suitable personal computing devices for accessing and/or interacting with social networking services include, by way of illustration and not limitation, desktop computers (such as desktop computer 104), laptop computers (such as laptop computer 222 of FIG. 2), tablet computers (such as tablet computer 106), mobile smart phones (such as mobile smart phone 102), smart watches, and the like. Each of these computing devices includes, at least, a processor, memory, and the ability (typically in the form of an app or application) to communicate over the network 108 with other network-connected devices and services, including social networking services 114 and 116.

The network 108 is a telecommunication network over which computing devices and network enabled devices may communicate and/or exchange data. By way of illustration, a computer network may comprise any of a local area network or LAN, a wide area network or WAN, or combinations of the two. According to various embodiments of the disclosed subject matter, the network 108 may comprise the Internet. As those skilled in the art will appreciate, the Internet is a global system of interconnected computer networks that use a defined protocol suite to link devices (including computers) worldwide. Additionally, the Internet is a network of networks that consists of private, public, academic, business, and government networks of varying scope and size, linked by a broad array of electronic, wireless, and optical networking technologies. According to aspects of the disclosed subject matter, the personal computing devices, including computing devices 102-106, can communicate with the network 108 by way of a wired connection, a wireless connection, an optical connection, or any combination of these.

As suggested in FIG. 1, various social networking services, such as social networking services 114 and 116, are typically implemented on one or more computing systems. Typically, though not exclusively, these computing systems are server computing systems, such as computing systems 110 and 112, particularly configured to implement and provide the functionality of a social network service, including providing the ability of one or more computer users to interact with its social networking service, including posting and/or re-posting content. While a social networking service 114 or 116 may be implemented on a single computing system, such as illustrated in regard to computing system 110, in various embodiments a social networking service, such as social networking service 116, may be implemented on multiple, cooperative computing systems, such as computing system 112.

Figure 2:
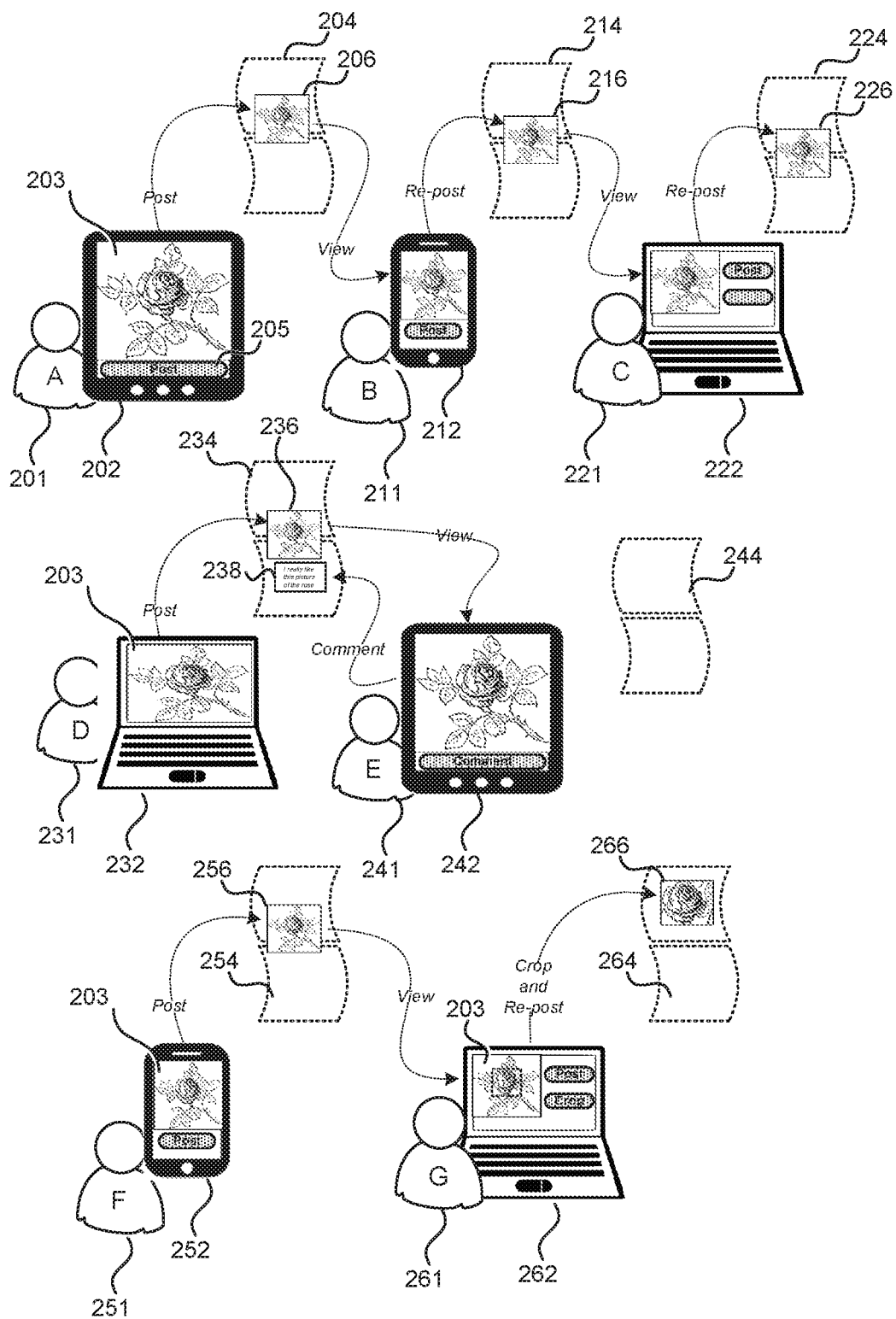
FIG. 2 is a pictorial diagram illustrating exemplary actions with regard to posting and re-posting content to a social networking service according to aspects of the disclosed subject matter.

Regarding the action of posting and/or re-posting content to a social networking service, FIG. 2 is a pictorial diagram illustrating exemplary user actions with regard to posting and re-posting one or more items of content to a social networking service, according to aspects of the disclosed subject matter. In regard to FIG. 2, it should be assumed that the various computing devices (i.e., computing devices 202, 212, 222, 232, 242, 252 and 262) are each communicatively connected to, at least, the same social networking service, such as social networking service 114 of FIG. 1, over a network 108.

By way of example and illustration, assume that computer user A 201, via computing device 202, is viewing an image 203, from a source location that is independent of the social networking service, and decides to share this image on the social networking service. By way of any of a number of potential user interactions, such as clicking on an interactive "post" control 205, this image 203 is uploaded to the computer user's virtual content space 204 as an original post/item of content 206.

Subsequent to computer user A 201 posting the item of content 206 to the social networking service, computer user B 211 views the posted item of content 206, as shown on computing device 212, and decides to re-post the item of content to his/her own virtual content space 214 of the social networking service. This re-posting becomes item of content 216. Moreover, subsequent to computer user B 211 posting (via a re-post action) the item of content 216, computer user C 221 views the posted item of content, as shown on computing device 222, and decides to also re-post that content to his/her virtual content space 224. This additional re-post results in an item of content 226 in computer user C's virtual content space 224 of the social networking service 114.

As suggested above, this succession of original post and re-posts of the image 203 creates a re-post chain that includes computer user A 201, computer user B 211, and computer user C 221. Generically speaking, each of the computer users is said to have "posted" the image as an item of content to his/her virtual content space maintained by the social networking service.

In accordance with various embodiments of the disclosed subject matter, as image 203 is re-posted, a determination is made by the social networking service as to whether the other users that have also posted this item of content (i.e., the image) are to be notified. For example, when computer user B 211 re-posts the image/item of content from computer user A's virtual content space 204, an evaluation of the computer user A 201 may indicate that there is a high probability of increasing computer user A's level of interaction with the social networking service if computer user A is notified of the re-post by computer user B. As will be discussed below, based on this determination, a notification (e.g., email, text message, etc.) is sent to computer user A 201 notifying that user of the re-posted image by computer user B 211. Likewise, when computer user C 221 re-posts the image/item of content from the virtual content space 214 of computer user B 211, the social networking service determines the probabilities of heightened user interaction for each user in the re-post chain which, in this case, consists of computer user A 201 and computer user B 211. Based on the determined probabilities of heightened user engagement by computer user A 201 and computer user B 211, the social networking service may send both users notification of the re-post activity by computer user C 221. However, it should be appreciated that the social networking service may, alternatively, determine that computer user B 211 is already a highly active user of the social networking service and that a notification to computer user B will likely not further increase this user's interaction with the social networking service. As such, a notification of the re-post action by computer user C 221 may not be sent to computer user B 211.

In furtherance of the example above, assume that computer user D 231, at some point, views the exact same image 203 as did computer user A 201, from some source other than the social networking service, as shown on computing device 232. As with computer user A 201, computer user D 231 also decides to share this image 203 on his/her virtual content space 234 as a posted item of content 236.

Subsequent to computer user D 231 posting the item of content 236 on his/her virtual content space 234, computer user E 241 views the posted content 236, as shown on computing device 242. For his/her part, computer user E 241 decides to comment on the posted content 236 of computer user D 231, resulting in comment 238 associated with posted content 236. However, computer user E 241 decides not to re-post the viewed item of content to his/her virtual content space 244.

In regard to the re-post chain mentioned above, neither of computer users D 231 or E 241 are part of that re-post chain. As set forth in this example, computer user D 231 is an original poster of the item of content 236, even though the content is identical to posted content 206. Computer user E 241 is not in the above-mentioned re-post chain, or in another re-post chain beginning with original poster 231, simply because computer user E did not re-post the item of content 236 (irrespective of computer user E's comments with regard to the item of content 236.) According to various embodiments of the disclosed subject matter, as neither computer user D 231 nor computer user E 241 have re-posted the image/item of content, the social networking service will not generate any notifications to other posters of this content (e.g., computer users A, B and C), irrespective of whether the image originates from the same external source location.

In furtherance of the example above, assume now that computer user F 251 also views the image 203 on computing device 252 from some source (but not as part of a re-post action of previously posted content on the social networking service.) In this example, computer user F 251 also decides to post the image 203 as an item of content 256 on his/her virtual content space 254. Computer user F 251, in this example, is an original poster of this item of content, just as computer user D 231 and computer user A 201 are original posters, irrespective that the item of content (i.e., the image 203) is the exact same item of content.

Subsequent to the original posting of the item of content 256, computer user G 261 views the posted item of content 256, as shown on computing device 262. In this case, computer user G 261 decides to post only a subset of the content, and performs a crop operation on the image 203. After generating an exact subsection of the image 203 via a crop operation, the resulting image is posted to the user's virtual content space 264 as an item of content 266. According to various embodiments of the disclosed subject matter, this "posting" of an exact subsection of a previously posted item of content may be considered as being a part of a repost chain, originating with computer user F 251. However, in alternative embodiments of the disclosed subject matter, only exact duplicate re-posts (and not exact subset re-posts) are considered to create and/or extend a re-post chain. In those embodiments in which a re-post of an exact subsection of an item of content is considered to extend a re-post chain, the social networking service will determine the probability of heightened user interaction by computer user F 251 by notifying the user of the re-post action by computer user G 261.

With regard to the example discussed in FIG. 2, upon receiving notice that another user re-posts an item of content on the social networking service 114, and in an effort to cause heightened user interaction with the social networking service, a determination is made as to which users to notify of the re-post action. Advantageously, methods for identifying select users that will likely generate increased user interaction with the social networking service upon receiving notification of a re-post action, without resorting to blanket notifications or non-selective campaigns, are set forth in routines 300 and 500 of FIGS. 3 and 5 below.

Figure 3:
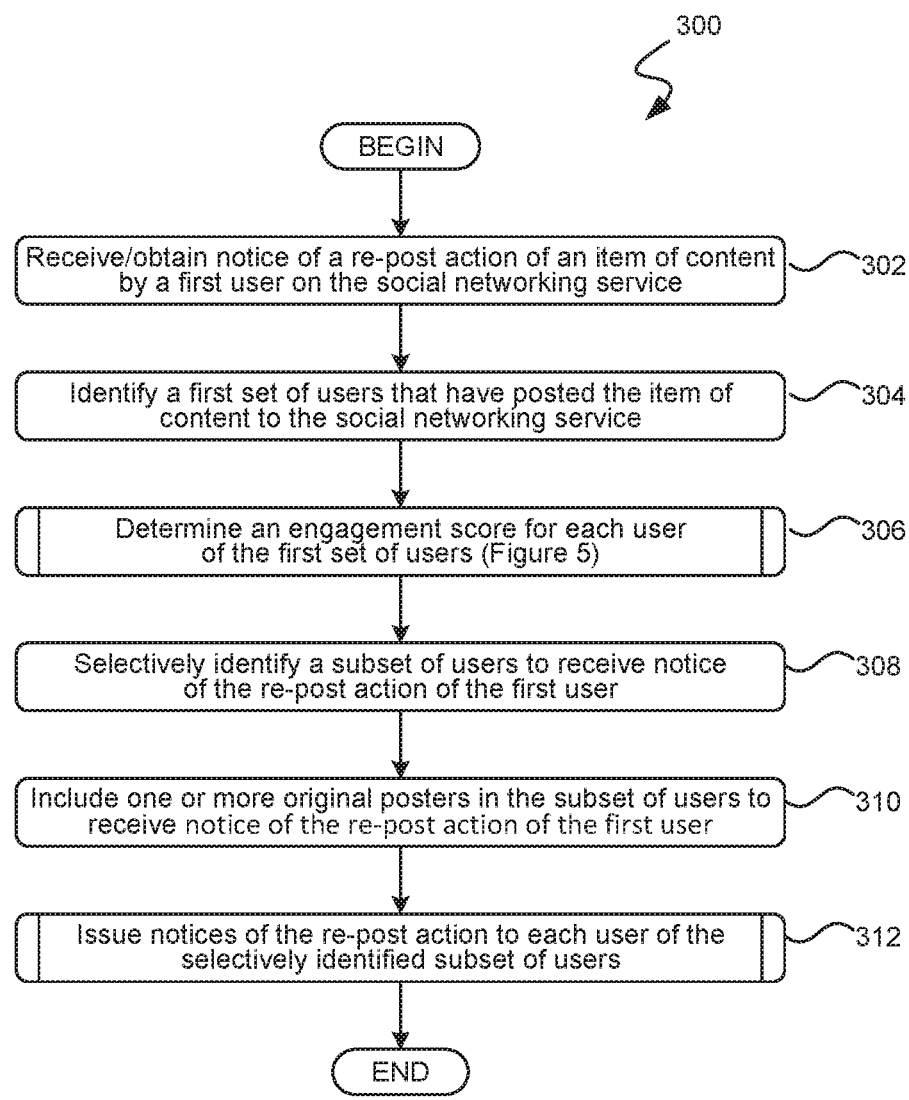
FIG. 3 is a flow diagram illustrating an exemplary routine for selecting a set of users for receiving notice of a re-post action of an item of content, according to aspects of the disclosed subject matter.

Turning to FIG. 3, FIG. 3 is a flow diagram illustrating an exemplary routine 300 suitable for implementation by a social networking service in selecting a set of users for issuing notice of a re-post action of an item of content, in accordance with aspects of the disclosed subject matter. More particularly, exemplary routine 300 is suitably configured to selectively identify a set of users for notification of a re-post action of an item of content by a first user, where the users are selectively identified in order to generate increased user engagement with the social network service, and to reduce resource consumption through blanket notifications.

Beginning at block 302, a notice regarding a re-post action of an item of content by a first user is received or obtained. With reference to the example of FIG. 2 described above, the notice may be in regard to the re-post of content 256 (assuming that an exact subsection of an item of content extends a re-post chain) by computer user G 261. In response to the notice of the re-post action, at block 304, a first set of users/subscribers of the social networking service is identified. This first set of users of the social networking service includes those users that have posted and/or re-posted the same item of content to the social networking service.

According to aspects of the disclosed subject matter, the identification of the first set of users includes only those users that have posted the exact item of content, either as an original post or a re-post, as identified in the notice of the re-post action. According to one embodiment, a "signature" of the content may be made and used as a key to locate other posts and/or re-posts of the same content in an indexed data base of all posts (including re-posts) on the social networking service. The users that have posted the same item of content are included in this first set of users. In regard to the example above, the set of first users would include computer user A 201, computer user B 211, computer user C 221, computer user D 231, and computer user F 251. The latest re-poster, in this example computer user F 261, may or may not be included in this first set of users depending on implementation considerations.

Figure 4:
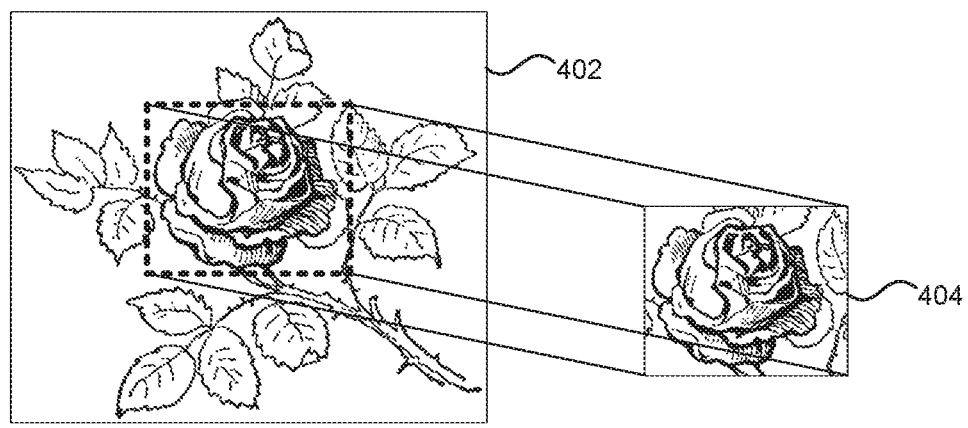
FIG. 4 is a pictorial diagram illustrating a source image and an exact subsection of the source image, according to aspects of the disclosed subject matter.

In an alternative embodiment of the disclosed subject matter, the identification of the first set of users may include those users that have posted the exact item of content as well as an exact subsection of the item of content. By way of definition, an exact subsection of an item of content corresponds to some particular subsection of the content. With reference to FIG. 4, FIG. 4 includes a source image 402 that, for purposes of this example, constitutes the entire "item of content." On the other hand, cropped image 404 represents a particular subsection of source image 402. More particularly, as image 404 includes only content that was found in source image 402, and the section of content in image 404 is an exact duplicate of the content in source image 402, then cropped image 404 is said to be an exact subsection of source image 402.

Of course, exact subsections are not limited to images. Similar rules can be applied to other types of content including, by way of illustration and not limitation, audio content, video content, textual content, and the like. Additionally, and according to aspects of the disclosed subject matter, to qualify as an exact subsection of a content item, a requirement may be made that a predetermined or relative threshold amount of subject matter of the source content be present in the exact subsection of the source item of content. For example, and by way of illustration and not limitation, in one embodiment, a requirement may be made that there must be at least 25% of the source content in a subsection to qualify as an exact subsection of an item of content.

Figure 5:
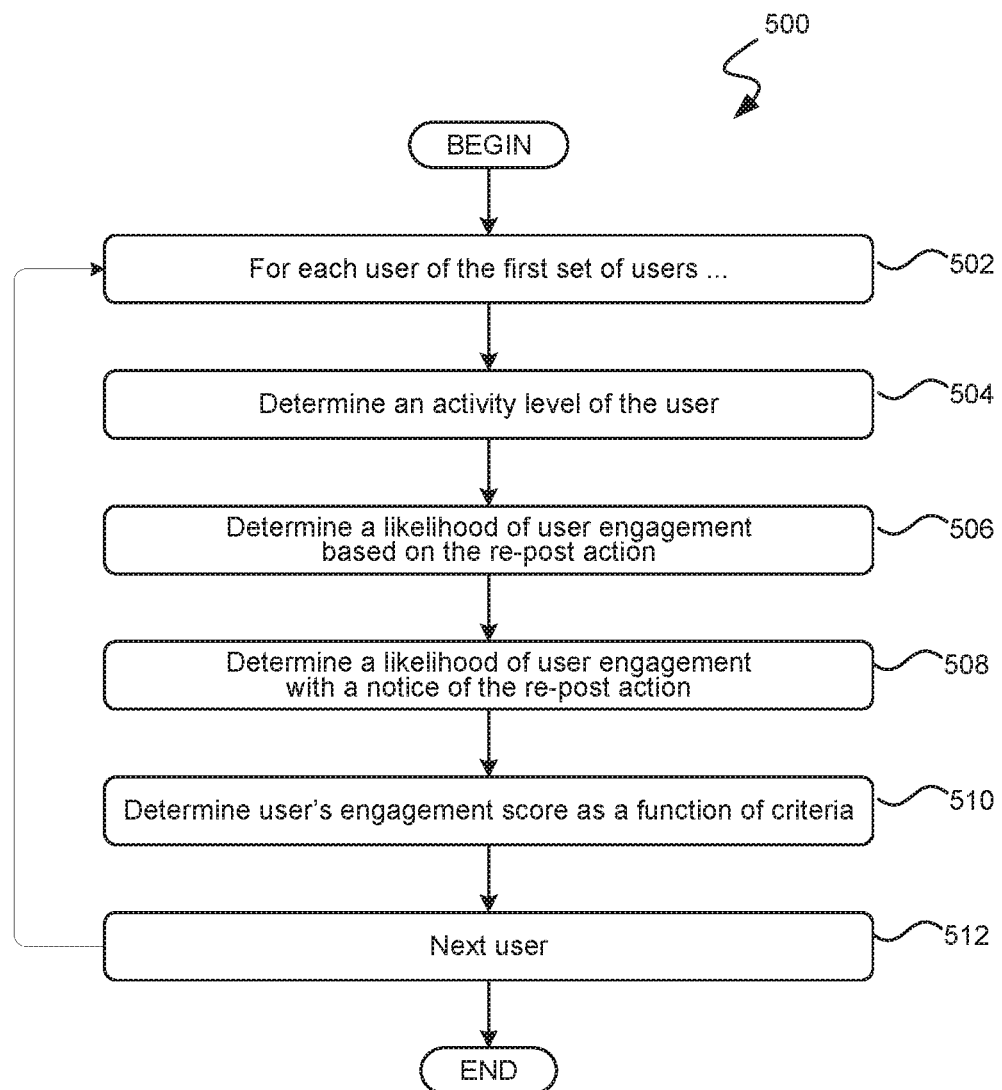
FIG. 5 is a flow diagram illustrating an exemplary routine for generating an engagement score for a set of users, in accordance with aspects of the disclosed subject matter.

Returning to routine 300, after identifying the first set of users, at block 306 engagement scores are determined for each user of the first set of users. The determination of the various engagement scores, corresponding to the likelihood of increased or heightened user engagement with the social networking service if the user is notified of the re-post action, is described in regard to routine 500 of FIG. 5. Turning to FIG. 5, this figure is a flow diagram illustrating an exemplary routine 500 for generating an engagement score for each user of a set of users, in accordance with aspects of the disclosed subject matter. Beginning at block 502, an iteration loop is begun to iterate through each of the users of the first set of users.

With regard to the current user of the iteration loop, at bock 504 an activity level for the current user is determined.

This activity level is a quantitative value determined according to the current user's engagement/activity on the social networking service during a most recent time period. By way of illustration and not limitation, the activity level of the current user is a reflection of the number of times that the user has interacted with the social networking service during the previous month. Other time periods may be used in various embodiments. Also, the activity level may reflect the aggregate amount time of the current user interaction/engagement with the social networking service during the previous time period. Of course, as indicated above, a user with an activity level that is (relatively) high may not be a good candidate for notification as the likelihood of heightened user interaction with the social networking service may actually be low, i.e., the user might not interact any more than already happens. Similarly, users that have relatively low activity levels may also be poor candidates for notification as their lack of interaction with the social networking service may indicate that they are no longer interested in any interaction with the service, irrespective of whether or not another user re-posted an item of content.

After determining an activity level, at block 506, an additional determination is made as to the likelihood of the current user's engagement with the social networking service based on an assumption that the current user is aware that another user re-posted content that the current user has posted (or re-posted.) According to aspects of the disclosed subject matter, this determination is made by a trained, machine learning model. Machine learning models are known in the art. More particularly, this machine learning model determines this likelihood based on various factors, including but not limited to, past behaviors of the current user, past behaviors of similar and similarly situated users, past behaviors of the current user's friends on the social networking site, the current user's personal preferences, the current user's indication of liking and/or disliking the same or similar content of the re-post action, and the like.

At block 508, yet another determination is made, this one directed to the likelihood of the current user engaging with a notice regarding the re-post activity. In other words, this determination is made as to whether the current user would read or ignore a message from the social networking service about the re-posting action of the first user. As with the prior determination regarding the current user's engagement based on knowledge of the re-posting action, this determination is made by a trained, machine learning model based on various factors, including but not limited to, past behaviors of the current user, past behaviors of similar and similarly situated users, past behaviors of the current user's friends on the social networking site, the current user's personal preferences, the current user's indication of liking and/or disliking the same or similar content of the re-post action, and the like.

At block 510, a predetermined function normalizes the various values (activity level, likelihood of increased user engagement with the social networking service, and likelihood of user interaction with a notice regarding the re-post action), weights them according to predetermined and/or configurable heuristics, combines or aggregates the various values, and determines a resulting engagement score for the current user. By way of illustration, as suggested above, both high activity and low activity values for the current user may indicate that sending a notice to the current user would be unproductive in light of the goal to increase user engagement with the social networking site. Accordingly, in normalizing and weighting the various values, both high and low activity levels may be devalued, where activity levels that fall in a "less active" range are weighted significantly. Similarly, balances may be struck between the various likelihood determinations in view of activity levels with the effect of generating an engagement score for the current user.

Additional factors or criteria may also be included in the calculus or function of determining an engagement score. For example, weighting users according to whether the users are in the re-post chain (re-posts from original poster to the first user) may be used. Comments of users with regard to the posted item of content may also be considered and/or factored into the calculus for function in determining an engagement score.

After determining the current user's engagement score, at block 512, the routine 400 returns to block 502 to process the next user in the first set of users. Alternatively, on the condition that there are no more users to score, the routine 500 terminates.

It should be appreciated that, while not shown in this routine (or in routine 300), in the event that the current user is notified of the re-post action of the first user, the current user's activity with regard to interacting with the notification as well as any changes to the current user's activity levels are returned to the machine learning models for updated training.

Returning again to routine 300, after determining the engagement scores for each of the users of the first set of users, at block 308, a subset of users of the first set of users is identified. This subset of users corresponds to those users whose engagement scores indicate the highest likelihood of heightened user interaction/engagement with the social networking service if the user is notified of the re-posting action of the first user. According to various embodiments, a predetermined percentage of the users of the first set of users having the highest engagement scores are identified or selected as being part of the subset of users. Alternatively, those users of the first set of users that meet or exceed a threshold value in regard to their engagement scores are included in the selected subset of users. Other bases for selecting users for inclusion in the subset of users may be used. One basis for selecting, or excluding, users for including in the subset of users may be the number of times that a given user has been recently notified by the social networking service. More particularly, the determination is or may be made as to how many times has a user been notified by the social networking service during the past, most-recent time period. This particular basis goes to the notion that users can become fatigued by constant notifications from the social networking service and, in such cases, additional notifications may result in decreased user engagement with the social networking service. Accordingly, and in one illustrative embodiment, if a user has already been notified by the social networking service 3 times during the past week, the user may be excluded from the set of users to receive the notification of the re-post action of the first user.

At block 310, one or more original posters of the identified content are also included in the subset of users to receive notice of the re-post action of the first user. This goes to the notion that the user that originally posted the content is likely to have the greatest interest in regard to further postings of that content.

At block 312, after having identified the subset users for notification, the social networking service issues the notification to each of the users of the subset. Thereafter, the routine 300 terminates.

Figure 6:
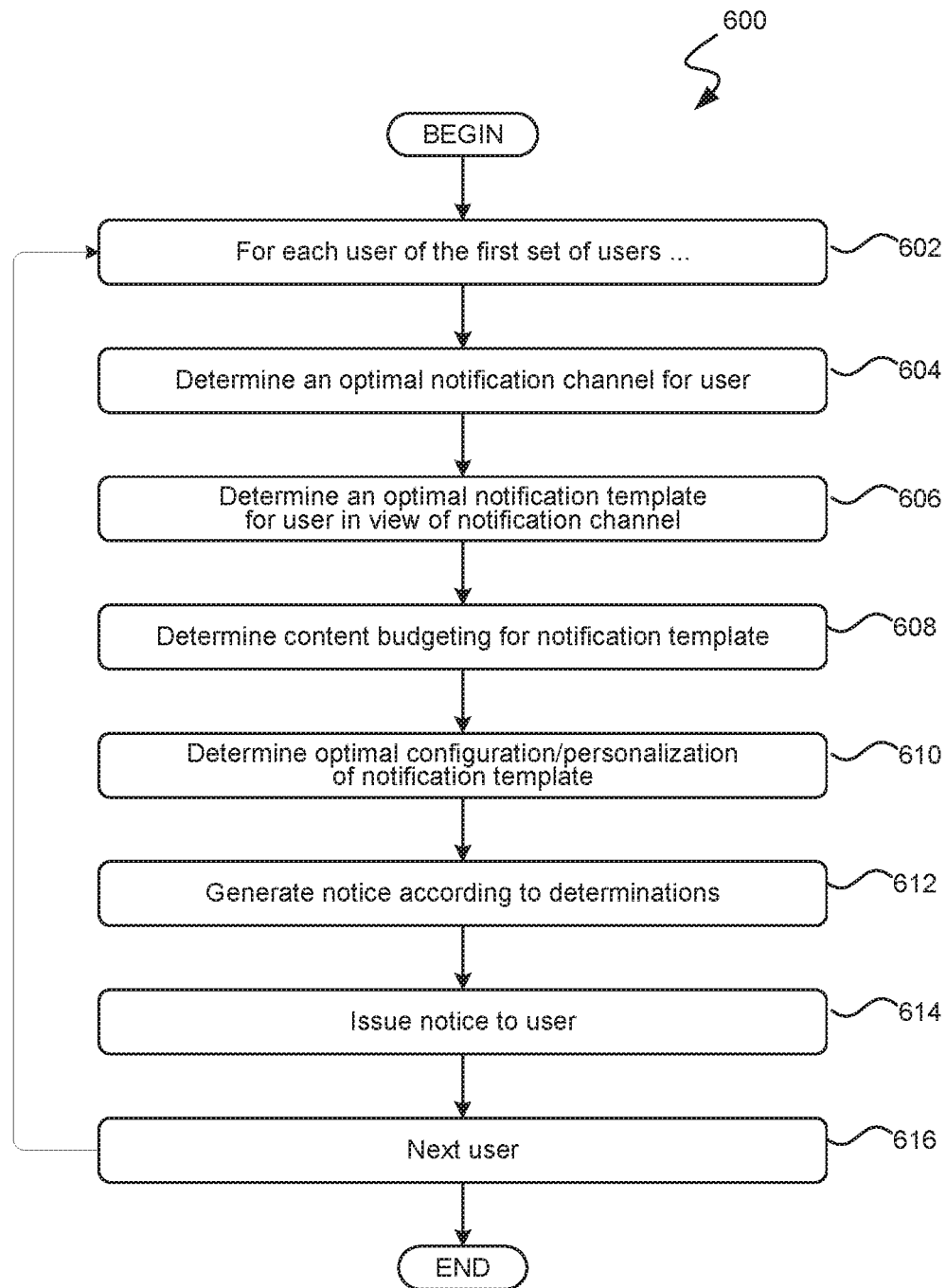
FIG. 6 is a flow diagram illustrating an exemplary routine suitable for providing/sending an optimal notice to a user that is most likely to generate increased user interaction with the social networking service according to aspects of the disclosed subject matter.

With a goal of notifying a set of users regarding a re-post action in order to generate increased user interaction with the social networking site, one or more additional analyses may be utilized to identify an optimal notification for each of the users of that set. More particularly, for each user one or more analyses may be conducted in order to form an optimal notification message to that user, with the intent of providing a notification that will most likely result in increased or heightened user engagement with the social networking service. In regard to identifying the optimal notification channels, FIG. 6 is a flow diagram illustrating an exemplary routine 600 suitable for providing/sending an optimal notice to each of a set of users, where the notification for each user is determined to be the communication channel that is most likely to generate increased user interaction with the social networking service.

Beginning in block 602, an iteration loop is begun to iterate through each user of a set of users that are to receive a notification. For example, this routine may process the subset of users discussed above in regard to routine 300 of FIG. 3, where each user is to receive a notification of the re-post action of the item of content by the first user. As those skilled in the art will appreciate, an iteration loop processes each element of a set in turn, in this case each user of the set users processed in turn, according to the various steps described below.

At block 604, a first determination is made in regard to an optimal manner of notification, or notification channel, for the currently processed user. According to various embodiments of the disclosed subject matter, this determination is made among a plurality of available communication channels and determined according to a machine learning model that relies upon preferences established by the currently processed user, the various channels available for notifying the currently processed user, the nature of the content to be communicated to the user, prior behaviors (particularly in view of heightened user interaction) of the currently processed user in regard to various notification channels, behaviors of similar users of the social networking service, the type of notification (e.g., of a re-post action by a first user), costs associated with each communication channel, and the like. The machine learning model, in execution and based on these and/or other criteria, determines the likelihood of user engagement (of the currently processed user) for each of the plurality of potential notification channels. Based on the various likelihoods, the model then selects an optimal notification channel, where "optimal" is determined according to the channel most likely to result in heightened user interaction with the social networking service. According to aspects of the disclosed subject matter, notification channels may include, by way of illustration and not limitation, e-mail notification, SMS (short messaging service) notification, MMS (multi-media messaging service) notification, active application notifications, and the like. The result of this determination is an optimal notification channel to use in communicating the current notice (e.g., of the re-post action of an item of content by a first user) to the currently processed user.

After identifying an optimal channel for communicating with the currently processed user, at block 606, a determination is made in regard to which of a plurality of channel-specific communication templates should be used in communicating with the currently processed user. According to aspects of the disclosed subject matter, each channel may have a plurality of templates, each with one or more specific intents. Alternatively, there may be a plurality of templates suitable for communicating a message to a user (such as notification of a re-post action of a first user) irrespective of the particular channel being used. In any event, according to aspects of the disclosed subject matter, each template has one or more particular intents as to how the information will be presented to a user. Regarding the intent of a template and by way of example, a template may include or utilize any one or more of images, relay a tone of urgency or freshness, relay a tone of information, include visual and/or audio content, relay peer, familiar, and/or social tendencies, and the like. As above, this determination (i.e., which notification template to use) is made to optimize the likelihood of user engagement with the social networking service, and is made according to a machine learning model which identifies which of the various templates is most likely to result that heightened user engagement with the social networking service. According to aspects of the disclosed subject matter, this machine learning model makes this determination according to past behaviors of the currently processed user in regard to various templates (in terms of generating increased user interaction with the social networking service), the past behaviors of similarly situated users of the social networking service, the nature of the subject matter being communicated to the user, and the like. The result of this determination is an optimal notification template to use in communicating the current notice (e.g., of the re-post action of an item of content by a first user) to the currently processed user by way of the optimal notification channel.

At block 608, based on the determined/selected notification template, a next determination is made as to an amount of content, the budgeted content, that should be included in the notification. As will be readily appreciated by those skilled in the art, quite often the amount of content regarding a repost action (or other action for which a notification might be presented to a user/subscriber) is substantially larger than the amount that may be presented to the user via a determined channel. Moreover, even when the determined channel is sufficiently capable of delivering all of the content that could be communicated to a user, it is often better to not deliver all content. Thus, according to aspects of the disclosed subject matter, a determination regarding a budgeted amount of the total content, for delivery to the user/subscriber via the determined channel, is made. In various embodiments, this budgeted amount is determined according to limitations (including, but not limited to size limitations and bandwidth limitations) corresponding to the selected notification channel, limitations corresponding to the selected/determined template (including, but not limited to, size limitations, limitations corresponding to intent or sentiment, and the like), as well as limitations and/or preferences corresponding to the user. In this regard, a machine learning model may consider the various factors (channel, template, content, user considerations) to determine a budgeted amount of content, as well as identifying what portions of the content are and are not included in the generated notice. Alternatively, one or more static heuristics may be applied to the various factors to identify the budgeted content.

At block 610, yet another determination is made in regard to configuring portions of the template within budgeted content of the selected communication template, as well as format structure. Indeed, while some of the budgeted content to be delivered will be based on the subject matter content of the notice, each template may include one or more locations where the language used to communicate with the currently processed user may be configured. For example, if a title of the content to be communicated is initially set as "New Posting," but identified as personalize-able or configurable, an alternative title (configured/personalized for the currently processed user) may be "Fresh Posting".

As part of configuring a template, considerations may also be given to the particular presentation format or arrangement of content. Indeed, configuration determinations such as the number of rows and/or columns of data may be made, as well as the number of distinct items (of the budgeted content) that may be included for a particular presentation format. As will be readily appreciated, the presentation format may be significant to the receiving party, especially dependent upon the type of device that the receiving party/user typically utilizes to view such content. For example, a single or two-column presentation may be very effective when the user is likely to view the notification on a mobile cell phone, and that a three-column presentation of content would be very unsatisfying on that same device in part because the user would not be able to view the content without scrolling both horizontally and vertically. Of course, if that same user were to typically utilize a desktop computer to view the notification, the user's experience may be enhanced by utilizing a three-column display of content. Similarly, notifications that have large numbers of distinct content items may be frustrating to users that have limited display capacity. Accordingly, in configuring a template, presentation format of content can, in some cases, enhance or decrease user satisfaction with the notification and, correspondingly, enhance or decrease user engagement with the social networking service.

According to aspects of the disclosed subject matter, a machine learning model, in execution, determines an optimal configuration of content in the configurable areas of the optimal template. The machine learning model selects an optimal personalization from a plurality of options, the selection made according to the most likely to heighten user engagement with the social networking service. In some instances, this determination may be further made in regard to the likelihood that the currently processed user will interact with the communication (as opposed to simply ignoring and/or deleting the communication). In various embodiments, a seed phrase regarding the budgeted content may be provided to a machine learning model specifically tailored to identify alternative phrases for configurable portions of the determined/selected template, and to further identify a version of the phrase that is mostly likely to result in heightened user engagement with the social networking service. This determination may further take into consideration past responses of the targeted user. According to various embodiments of the disclosed subject matter, a natural-language processing model may be used to translate a seed term or phrase into a set of alternative phrases. Moreover, cross-language generation, i.e., generating terms and/or phrases in a second language from a seed term/phrase in a first language is also accomplished depending on the target language of the currently processed user.

In regard to configuring the template according to structure, in various embodiments a template may comprise one or more formats for presenting the budgeted content. Selection of the configurable formats may be made according to the type of budgeted content, the amount of budgeted content, the delivery channel (and any constraints that may be included in the channel), user preferences regarding the format of content, as well as past behaviors of the currently processed user (and similarly situated users) in regard to increasing user interaction with the social networking service.

As above, these determinations are made (by way of illustration and not limitation) according to past behaviors of the currently processed user in regard to various language/terminology configurations (in terms of generating heightened user interaction with the social networking service and well as ensuring user engagement with the notification), the past behaviors of similarly situated users of the social networking service, the nature of the subject matter being communicated to the user, the one or more intents of the optimally selected template, and the like. The result of this determination is the inclusion of optimally configured content in configurable areas of the selected template. Of course, while language is one potential form of personal configuration, other configurations may include replacing configurable content with images, audio content, audio/visual content, and the like. Indeed, it is not necessary to replace content with similar/like content, e.g., textual content does not have to be replaced/personalized with textual content but, instead, could be replaced with audio content, or another form of content.

At block 612, based on the various determinations and the budgeted subject matter/content to be delivered to the currently processed user, a notice particularly crafted for the currently processed user is generated. Thereafter, at block 614, the generated notice is issued or transmitted to the currently processed user.

At block 616, if there are additional users of the set of users to process, the routine 600 returns to block 602 for the additional processing. Alternatively, if there are no additional users to process, the routine 600 terminates.

While not indicated in routine 600, after the notification is provided to the users, one or more aspects of the behavior of each user that received a notification may be tracked and provided to the various machine learning models in order to improve the accuracy of the various models' determinations.

Regarding the routine 600 above, while this routine is described in conjunction with generating the notifications to the sub-set of users regarding the re-post action of the item of content by the first user, it should be appreciated that this routine 600 may be advantageously implemented in nearly any situation in which the social networking service intends to send out notifications to one or more users. For example, in the event that several users subscribe to a particular user's virtual content space (such that these several users are notified when the particular user posts content to the content space), notification to this set of users may be processed according to the elements of routine 600.

Regarding routines 300, 500 and 600 described above, as well as other routines and/or processes described or suggested herein, while these routines/processes are expressed in regard to discrete steps, these steps should be viewed as being logical in nature and may or may not correspond to any specific actual and/or discrete execution steps of a given implementation. Also, the order in which these steps are presented in the various routines and processes, unless otherwise indicated, should not be construed as the only or best order in which the steps may be carried out. Moreover, in some instances, some of these steps may be combined and/or omitted. Those skilled in the art will recognize that the logical presentation of steps is sufficiently instructive to carry out aspects of the claimed subject matter irrespective of any particular development or coding language in which the logical instructions/steps are encoded.

Of course, while these routines and/or processes include various novel features of the disclosed subject matter, other steps (not listed) may also be included and carried out in the execution of the subject matter set forth in these routines, some of which have been suggested above. Those skilled in the art will appreciate that the logical steps of these routines may be combined together or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices, such as the computing device described in regard to FIG. 7 below. Additionally, in various embodiments all or some of the various routines may also be embodied in executable hardware modules including, but not limited to, systems on chips (SoC's), codecs, specially designed processors and or logic circuits, and the like.

As suggested above, these routines and/or processes are typically embodied within executable code blocks and/or modules comprising routines, functions, looping structures, selectors and switches such as if-then and if-then-else statements, assignments, arithmetic computations, and the like that, in execution, configure a computing device to operate in accordance with the routines/processes. However, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in routines embodied within applications (also referred to as computer programs), apps (small, generally single or narrow purposed applications), and/or methods, these aspects may also be embodied as computer executable instructions stored by computer readable media, also referred to as computer readable storage media, which are articles of manufacture. As those skilled in the art will recognize, computer readable media can host, store and/or reproduce computer executable instructions and data for later retrieval and/or execution. When the computer executable instructions that are hosted or stored on the computer readable storage devices are executed by a processor of a computing device, the execution thereof causes, configures and/or adapts the executing computing device to carry out various steps, methods and/or functionality, including those steps, methods, and routines described above in regard to the various illustrated routines and/or processes. Examples of computer readable media include, but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random-access memory (RAM), read-only memory (ROM), memory cards, thumb drives, and the like; cloud storage (i.e., an online storage service); and the like. While computer readable media may reproduce and/or cause to deliver the computer executable instructions and data to a computing device for execution by one or more processors via various transmission means and mediums, including carrier waves and/or propagated signals, for purposes of this disclosure computer readable media expressly excludes carrier waves and/or propagated signals.

Figure 7:
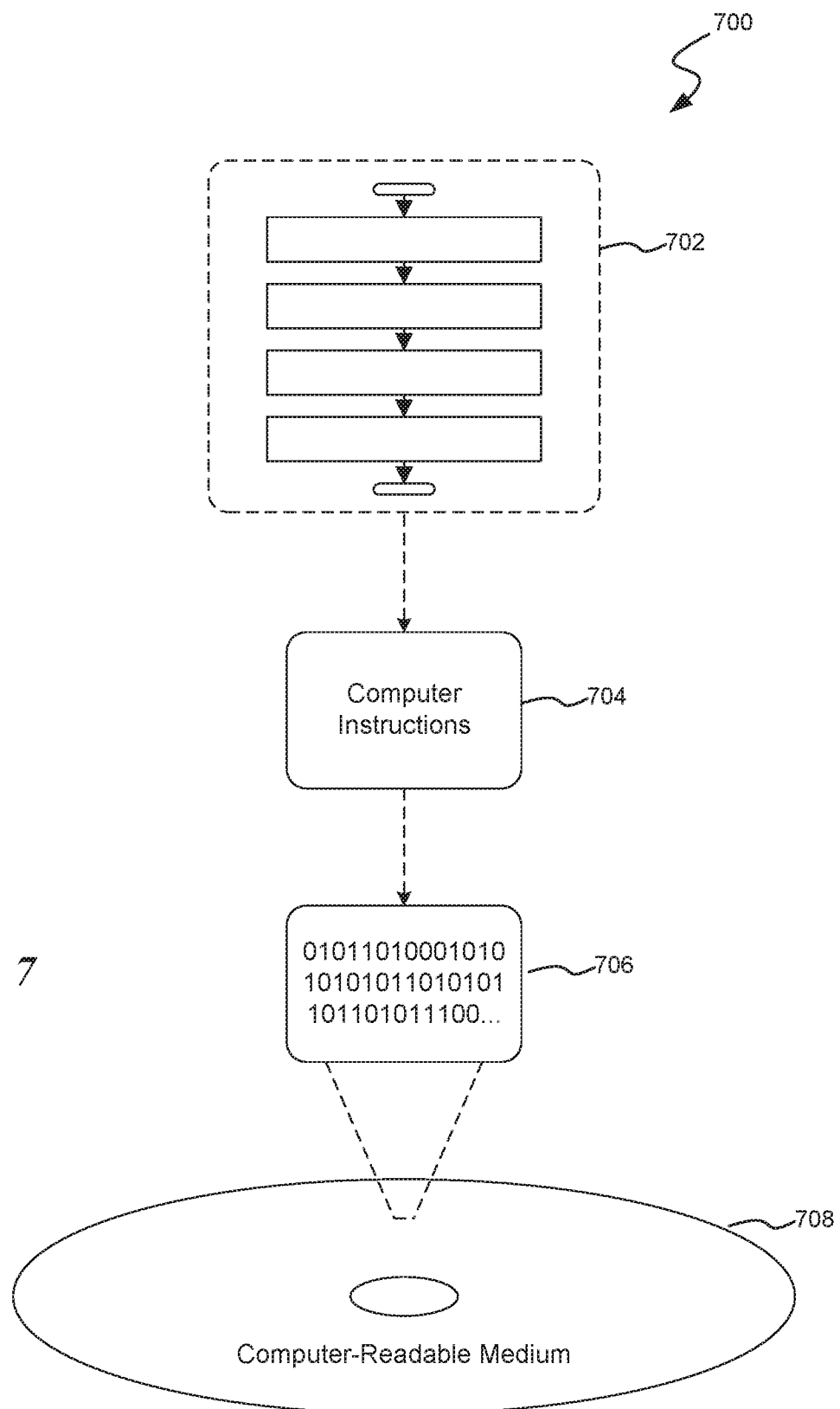
FIG. 7 is a block diagram illustrating an exemplary computer readable medium encoded with instructions for optimally and selectively identifying notice recipients of a re-post action of an item of content, according to aspects of the disclosed subject matter.

Regarding computer readable media, FIG. 7 is a block diagram illustrating an exemplary computer readable medium encoded with instructions for selecting a set of users for receiving notice of a re-post action of an item of content, as described in regard to routines 300, 500 and 600 of FIGS. 3, 5 and 6. More particularly, the implementation 700 comprises a computer-readable medium 708 (e.g., a CD-R, DVD-R or a platter of a hard drive), on which is encoded computer-readable data 706. This computer-readable data 706 in turn comprises a set of computer instructions 704 configured to operate according to one or more of the principles set forth herein. In one such embodiment 702, the processor-executable instructions 704 may be configured to perform a method, such as at least some of exemplary routine 300, for example. In another such embodiment, the processor-executable instructions 704 may be configured to implement a system on a computing device, such as at least some of the exemplary, executable components of computing device 800 of FIG. 8, as described below. Many such computer readable media may be devised, by those of ordinary skill in the art, which are configured to operate in accordance with the techniques presented herein.

Figure 8:
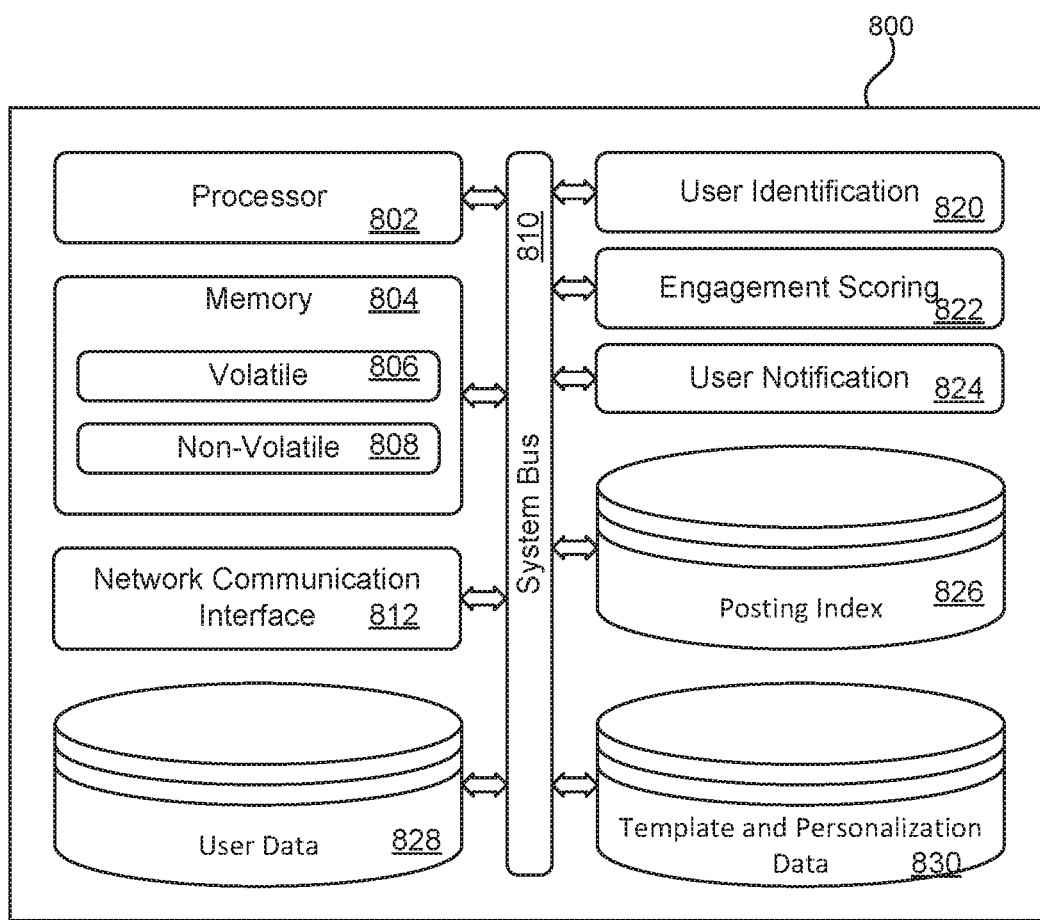
FIG. 8 is a block diagram illustrating an exemplary computing system suitably configured for optimally and selectively identifying user/recipients to receive notice of a re-post action of an item of content, according to aspects of the disclosed subject matter.

Turning now to FIG. 8, FIG. 8 is a block diagram illustrating an exemplary computing system 800 (or computing device) suitably configured for optimally and selectively identifying notice recipients according to aspects of the disclosed subject matter. The computing system 800 typically includes one or more processors (or processing units), such as processor 802, and further includes at least one memory 804. The processor 802 and memory 804, as well as other components of the computing system, are interconnected by way of a system bus 810.

As will be appreciated by those skilled in the art, the memory 804 typically (but not always) comprises both volatile memory 806 and non-volatile memory 808. Volatile memory 806 retains or stores information so long as the memory is supplied with power. In contrast, non-volatile memory 808 is capable of storing (or persisting) information even when a power supply is not available. Generally speaking, RAM and CPU cache memory are examples of volatile memory 806 whereas ROM, solid-state memory devices, memory storage devices, and/or memory cards are examples of non-volatile memory 808.

As will be further appreciated by those skilled in the art, the processor 802 executes instructions retrieved from the memory 804, from computer readable media, such as computer readable media 708 of FIG. 7, and/or other executable components in carrying out the various functions of identifying users for notification. The processor 802 may be comprised of any of a number of available processors such as single-processor, multi-processor, single-core units, and multi-core units, which are well known in the art.

Further still, the illustrated computing system 800 typically also includes a network communication interface 812 for interconnecting this computing system with other devices, computers and/or services over a computer network, such as network 108 of FIG. 1. The network communication interface 812, sometimes referred to as a network interface card or NIC, communicates over a network using one or more communication protocols via a physical/tangible (e.g., wired, optical fiber, etc.) connection, a wireless connection such as WiFi or Bluetooth communication protocols, NFC, or a combination thereof. As will be readily appreciated by those skilled in the art, a network communication interface, such as network communication component 812, is typically comprised of hardware and/or firmware components (and may also include or comprise executable software components) that transmit and receive digital and/or analog signals over a transmission medium (i.e., the network.)

The exemplary computing system 800 further includes an executable user identification component 820. In execution/operation on the computing system, the user identification component 820 identifies one or more users/subscribers (i.e., a set of users) of the social networking service implemented and operated on the computing system 800 that have posted a given item of content on the social networking service, such as social networking services 114 and 116. According to one embodiment, the user identification component 820 identifies one or more users according to information stored in a posting index data base 826 using an identifier associated with the item of content as a key into the posting index.

The exemplary computing system 800 further includes an executable engagement scoring component 822. As described above in regard to routine 500 of FIG. 5, the engagement scoring component 822, in execution/operation on the computing system, determines an engagement score for each of a set of users of the social networking service, where the engagement score is an indication of the likelihood of increased or heightened user engagement with the social networking service through issuing a notification to the user of a re-post action of an item of content by another user. The engagement scores for each user, as set forth above, are determined as a function of all or some of a user's activity level, likelihood of heightened engagement with the social networking service with knowledge of the re-post action, and likelihood of user engagement with the notification regarding the re-post action. Of course, as mentioned above, other criteria may also be included in the function's calculus in determining the engagement score.

Still further included in the exemplary computing system 800 is an executable user notification component 824. In execution on the computing system 800 as part of the social networking service, such as social networking service 114 or 116, the user notification component 824 receives a notice from within the social networking service that a re-post action of an item of content by a first user has occurred. As set forth in regard to routine 300 of FIG. 3 above, the user notification component 824 obtains a first set of users that have posted (or re-posted) the item of content on the social networking service by way of the user identification component 820. The user notification component 824 then associates engagement scores for each of the users of this first set of users by way of the engagement scoring component 822, as described above. The user notification component then identifies a subset of users of the first set of users according to the engagement scores, with the goal of identifying those users that, if provided a notification of the first user's re-post action of the item of content, will generate heightened user interaction with the social networking service. Aspects of this selection of users of the subset is described above in regard to routine 300 of FIG. 3. After identifying the subset of users, the user notification component 824 issues notices to each of the users of this subset in regard to the re-post action of the first user on the social networking service.

In regard to the user notification component, more generally the user notification component takes a list of users (such as the subset of users described in routine 300) and, as set forth in regard to routine 600 of FIG. 6, determines various criteria for each user according to one or more machine learning models with the intent to make optimal determinations regarding the notifications that are most likely to result in heightened user engagement with the social networking service. More particularly, for each of the users to be notified, in a first instance the user notification component determines an optimal notification channel to use for communicating with the corresponding user. This determination/selection is made among a plurality of possible, available communication channels according to a machine learning model that relies upon preferences established by a user and various channels available for notifying the user (as may be stored in a user data store 828), the nature of the content to be communicated with the user, prior behaviors of the currently processed user in regard to various notification channels, behaviors of similar users of the social networking service, the type of notification (e.g., of a re-post action by a first user), and the like. The user notification component 824, in execution and based on these and/or other criteria, determines the likelihood of user engagement for each of the plurality of potential notification channels and selects an optimal notification channel, where "optimal" is determined according to the channel most likely to result in heightened user interaction with the social networking service. According to aspects of the disclosed subject matter, notification channels may include, by way of illustration and not limitation, e-mail notification, SMS (short messaging service) notification, MMS (multi-media messaging service) notification, active application notifications, and the like. The result of this determination, then, is an optimal notification channel to use in communicating a notice (e.g., of the re-post action of an item of content by a first user) to a corresponding user.

In addition to selecting a notification channel, the user notification component 824 further determines/selects a notification template for each user from a plurality of notification templates. User notification templates, which include one or more configurable portions for personalization, are maintained by the system, such as in a template and personalization data store 830. According to aspects of the disclosed subject matter, each channel may have or be associated with a plurality of templates, each with one or more specific intents. Alternatively, there may be a plurality of templates suitable for communicating a message to a user (such as notification of a re-post action of a first user) irrespective of the particular channel being used. In any event, according to aspects of the disclosed subject matter, each template has one or more particular intents as to how the information will be presented to a user. As above, this determination (which notification template to use) is made to optimize the likelihood of user engagement with the social networking service, and is made according to a machine learning model which identifies which of the various templates is most likely to result in heightened user engagement with the social networking service. This machine learning model makes the determination or selection according to past behaviors of a user in regard to various templates (in terms of generating increased user interaction with the social networking service), the past behaviors of similarly situated users of the social networking service, the nature of the subject matter being communicated to the user, and the like. The result of this determination is the selection of an optimal notification template to use in communicating a current notice (e.g., of the re-post action of an item of content by a first user) to a corresponding user by way of the optimal notification channel.

The user notification component 824 makes yet another determination/selection in regard to customizations/personalizations that are to be applied to the optimal notification template. Regarding these configurations or personalizations, while some of the content to be delivered is established by the subject matter of the notice to be sent, each template may include one or more locations where the language used to communicate with a user may be configured/personalized. The user notification component 824, via a machine learning model, determines an optimal configuration of content in the configurable areas of the optimal template for each user. The machine learning model selects an optimal personalization from a plurality of options, the selection made according to the most likely to heighten user engagement with the social networking service, as well as what is most likely to ensure user interaction with the notification itself (i.e., read the notification). As above, these determinations are made according to past behaviors of the currently processed user in regard to various language/terminology configurations (in terms of generating heightened user interaction with the social networking service), the past behaviors of similarly situated users of the social networking service, the nature of the subject matter being communicated to the user, the one or more intents of the optimally selected template, and the like. The result of these determinations is the inclusion of optimally selected language in configurable areas of the selected template.

Regarding these various components of the illustrated computing system 800, those skilled in the art will appreciate that many of these components may be implemented as executable software modules stored in the memory of the computing device, as executable hardware modules and/or components (including SoCs—systems on a chip), or a combination thereof. Indeed, components may be implemented according to various executable embodiments including executable software modules that carry out one or more logical elements of the processes described in this document, or as hardware and/or firmware components that include executable logic to carry out the one or more logical elements of the processes described in this document. Examples of these executable hardware components include, by way of illustration and not limitation, ROM (read-only memory) devices, programmable logic array (PLA) devices, PROM (programmable read-only memory) devices, EPROM (erasable PROM) devices, and the like, each of which may be encoded with instructions and/or logic which, in execution, carry out the functions and features described herein.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer-implemented method for issuing notices to users of a social networking service, the method comprising:
    obtaining notice of a post action of an item of content by a first user of the social networking service;
    identifying a first set of users of the social networking service consisting of users of the social networking service that have previously posted the item of content to the social networking service;
    determining a user engagement score for each user of the first set of users, wherein each user engagement score is indicative of a likelihood of increasing an engagement of a corresponding user with the social networking service, wherein the user engagement score for a user of the first set of users is determined, in part, as a function of the activity level of the user with the social networking service during a previous time period such that the user engagement score for the user is lessened if the user was highly active during the previous time period;
    identifying a second set of users from the first set of users having the highest determined user engagement scores of the users of the first set of users; and
    for each user of the second set of users:
        determining a notification template for a corresponding user according to the user engagement score of the corresponding user from a plurality of notification templates of the social networking service, wherein the notification template for the corresponding user is determined according to an executing machine learning model trained to determine a notification template likely to increase engagement of the corresponding user with the social network service;
        generating a notification for the corresponding user regarding the post action of the first user according to the determined notification template; and
        issuing the notification to the corresponding user regarding the post action of the item of content by the first user.

2. The computer-implemented method of claim 1, wherein the notification template comprises at least one configurable portion for personalizing the notification template for the corresponding user.

3. The computer-implemented method of claim 2, further comprising determining a personalization of the at least one configurable portion of the notification template according to a second likelihood of increasing engagement of the corresponding user with the social networking service.

4. The computer-implemented method of claim 3, further comprising generating a notification for the corresponding user regarding the post action of the first user according to the determined notification template and the personalization of the configurable portion of the notification template.

5. The computer-implemented method of claim 4, further comprising:
    determining a notification channel of a plurality of notification channels for the corresponding user according to a third likelihood of increasing engagement of the corresponding user with the social networking service;
    wherein issuing the notification to the corresponding user regarding the post action of the item of content by the first user comprises issuing the notification to the corresponding user via the determined notification channel.

6. The computer-implemented method of claim 1, wherein determining the user engagement score for each user of the first set of users is further made, at least in part, according to a second executing machine learning model implemented to determine a likelihood of increased user engagement upon knowledge of a post action of the item of content by the first user.

7. The computer-implemented method of claim 1, further comprising:
    determining a budgeted amount of content to include in a notification for the corresponding user regarding the post action of the first user; and
    wherein generating the notification for the corresponding user regarding the post action of the first user according to the determined notification template comprises generating the notification to include the budgeted amount of content.

8. The computer-implemented method of claim 7, wherein determining the budgeted amount of content to include in the notification comprises determining the budgeted amount of content according to any of the size limitations of a determined notification channel and the determined notification template, bandwidth limitations of the determined notification channel, and user preferences.

9. A computer-readable medium bearing computer-executable instructions which, when executed on a computing system comprising at least a processor, carry out a method of issuing notices to users of a social networking service, the method comprising:

obtaining notice of a post action of an item of content by a first user of the social networking service;

identifying a first set of users of the social networking service consisting of users of the social networking service that have previously posted the item of content to the social networking service;

determining a user engagement score for each user of the first set of users, wherein the user engagement score is indicative of a likelihood of increased engagement of a corresponding user with the social networking service, wherein the user engagement score for a user of the first set of users is determined, at least in part, as a function of the activity level of the user with the social networking service during a previous time period such that the user engagement score for the user is reduced if the user was highly active during the previous time period and the user engagement score for the user is increased if the user was less active during the previous time period;

identifying a second set of users from the first set of users having the highest determined user engagement scores of the users of the first set of users; and for each user of the second set of users:
   determining a notification template for a corresponding user according to the user engagement score of the corresponding user from a plurality of notification templates, wherein the notification template for the corresponding user is determined according to an executing machine learning model trained to determine a notification template likely to increase engagement of the corresponding user with the social network service;
   generating a notification for the corresponding user regarding the post action of the first user according to the determined notification template; and
   issuing the notification to the corresponding user regarding the post action of the item of content by the first user.

10. The computer-readable medium of claim 9, wherein the notification template comprises at least one configurable portion for personalizing the notification template for the corresponding user.

11. The computer-readable medium of claim 10, further comprising determining a personalization of the configurable portion of the notification template according to a second likelihood of increasing engagement of the corresponding user with the social networking service.

12. The computer-readable medium of claim 11, further comprising generating a notification for the corresponding user regarding the post action of the first user according to the determined notification template and the personalization of the configurable portion of the notification template.

13. The computer-readable medium of claim 12, further comprising:
   determining a notification channel of a plurality of notification channels for the corresponding user according to a third likelihood of increasing engagement of the corresponding user with the social networking service;
   wherein issuing the notification to the corresponding user regarding the post action of the item of content by the first user comprises issuing the notification to the corresponding user via the determined notification channel.

14. The computer-readable medium of claim 13, wherein the executing machine learning model is further implemented to identify one or more likelihoods of increased engagement of the corresponding user with the social networking service for a plurality of notification templates.

15. The computer-readable medium of claim 13, wherein the executing machine learning model is further implemented to identify one or more likelihoods of increased engagement of the corresponding user with the social networking service for a plurality of notification channels.

16. A computer system for issuing notices to a set of users of a social networking service, the computer system comprising a processor and a memory, wherein the processor, in executing instructions stored in the memory, configures the computer system to, at least:
   detect a post action of an item of content by a first user of the social networking service;
   determine a first list of users of the social networking service consisting of a first plurality of users that have posted the item of content to the social networking service;
   generate a user engagement score for each user of the first list of users, wherein the user engagement score is indicative of the likelihood that a notification of the post of the item of content by the first user will result in increased user engagement of the corresponding user with the social networking service, and wherein the user engagement score for a user of the first set of users is determined, at least in part, as a function of the activity level of the user with the social networking service during a previous time period such that the user engagement score for the user is lessened if the user was highly active during the previous time period;
   determine a second list of users from the first list of users comprising a second plurality of users having the highest user engagement scores, wherein the first plurality of users and the second plurality of users are not the same; and
   for each user of the second set of users:
      determine a notification template for a corresponding user from a plurality of notification templates according to the user engagement score of the corresponding user, wherein the notification template for the corresponding user is determined according to an executing machine learning model trained to determine a notification template likely to increase engagement of the corresponding user with the social network service;
      generate a notification for the corresponding user regarding a notification content according to the determined notification template; and
      issue the notification to the corresponding user.

17. The computer system of claim 16, wherein the notification template comprises at least one configurable portion for personalizing the notification template for the corresponding user; and
   wherein issuing the notification to the corresponding user further comprises determining a personalization of the configurable portion of the notification template according to a second likelihood of increasing engagement of the corresponding user with the social networking service.

18. The computer system of claim 17, wherein issuing the notification to the corresponding user further comprises generating a notification for the corresponding user of the notification content according to the determined notification template and the personalization of the configurable portion of the notification template.

19. The computer system of claim 18, wherein issuing the notification to the corresponding user further comprises:

determining a notification channel of a plurality of notification channels for the corresponding user according to a third likelihood of increasing engagement of the corresponding user with the social networking service;

wherein issuing the notification to the corresponding user regarding the post action of the item of content by the first user comprises issuing the notification to the corresponding user via the determined notification channel.

20. The computer system of claim 19, wherein the executing machine learning model is further implemented to identify one or more likelihoods of increased engagement of the corresponding user with the social networking service for a plurality of notification templates.

\* \* \* \* \*